(No Model.)

P. A. GORDON.
SAFETY BOLT.

No. 303,636. Patented Aug. 19, 1884.

Witnesses.
J. H. Burridge,
M. J. Bartlett

Inventor.
P. A. Gordon
W. H. Burridge
atty,

UNITED STATES PATENT OFFICE.

PERKINS A. GORDON, OF MILAN, OHIO.

SAFETY-BOLT.

SPECIFICATION forming part of Letters Patent No. 303,636, dated August 19, 1884.

Application filed July 23, 1883. (No model.)

*To all whom it may concern:*

Be it known that I, PERKINS A. GORDON, of Milan, in the county of Erie and State of Ohio, have invented new and useful Improvements in Safety-Bolts; and I do hereby declare that the following is a full and complete description thereof.

The object of the invention above referred to is to prevent the nut from working loose and leaving the bolt.

A detailed description of the invention is substantially as follows, reference being had to the accompanying drawings, making a part of this specification, and in which—

Figure 1:
Figure 2:
Figure 3:
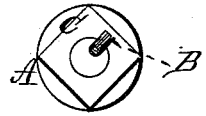

Figure 1 represents an unthreaded bolt having applied thereto the nut-fastener or device for securing the nut on the bolt. Fig. 2 shows the bolt and the nut-fastener threaded and a nut screwed thereon. Fig. 3 is an end view of the bolt with the nut thereon secured by means of the nut-fastener.

Like letters refer to like parts in the several drawings.

On reference to the drawings the invention will be readily understood, which consists of the bolt A, Fig. 1, and having in the side of the end thereof cut or made a groove, wherein is inserted a flexible hard-metal rod or wire, B, so that its surface may be flush with the surface of the bolt-shank, and having its outer end projecting beyond the end of the bolt and forming a part of the same, as shown in the drawings. The inner end of the said rod or wire is fixed in the groove by being soldered therein or by a compression of the sides of the groove upon the end portion thereof, or by other suitable means. This rod or wire key secured in the shank of the bolt is shown in Fig. 1, in which it will be seen that there is no thread cut on the bolt and wire.

In Fig. 2 the bolt is represented as having a thread cut thereon. While this thread was being cut a thread was also formed upon the wire or key B by the same dies and at the same time. When the bolt is inserted in place, and the nut C screwed thereon, the nut is prevented from coming off by the key B, which is raised from the groove and bent in an angular relation to the bolt and against the face of the nut, as seen in Fig. 3.

I am aware that an unthreaded soft-metal rod or key, *e g*, of lead or its alloys, has been inserted in a groove of the bolt, and that the nut has been screwed on over the key or rod, either not then touching the key or then threading the key, and that the key has been then bent down over the bolt. My key or rod is of hard metal, which may consist of annealed iron wire or rods, and is threaded before the nut is applied.

What I claim as my invention, and desire to secure by Letters Patent, is—

The threaded flexible hard-metal wire or rod inserted and secured in a groove or slot in the side of the bolt, thus forming a part of the bolt-thread and capable of being raised from the slot and bent at right angles to the bolt for the purpose of securing the nut in place, substantially as shown and described.

PERKINS A. GORDON.

Witnesses:
E. ANDREWS,
DARWIN FAY.